3,180,736
FATTY ACID LACTYLATE-MONOGLYCERIDE
EMULSIFIER COMPOSITION FOR BAKERY
PRODUCTS
Bert W. Landfried, Independence, Mo., assignor, by mesne assignments, to Top-Scor Products, Inc., a corporation of New York
No Drawing. Filed Aug. 9, 1961, Ser. No. 130,268
3 Claims. (Cl. 99—91)

This invention relates to improved emulsifier compositions, and more particularly to quality improving agents of the type containing monoglycerides of the fat forming fatty acids for use in the production of bakery goods.

It has long been the practice among commercial bakers to use distilled mono or mixtures of mono and diglycerides of the fat forming acids as quality improving agents in all types of bakery goods, including both yeast raised and chemically leavened products. (The term "monoglyceride" will be used hereinafter to denote either mono or mixtures of mono and diglycerides.) The monoglyceride acts as an emulsifier and, when used at optimal levels in bakery goods, has the properties of improving tenderness and mouth feel, inhibiting factors leading to staling, increasing volume and generally augmenting consumer acceptability. The levels of monoglyceride in the bakery goods vary rather widely in practice, ranging from as low as .1% based on the flour weight in the case of breads to level as high as 5% based on the flour weight in certain varieties of cakes. The monoglyceride may be added as part of a super-glycerinated shortening or as a separate ingredient.

The present invention is concerned with improving the quality of bakery products without a corresponding increase in cost or decreasing the cost of bakery products without sacrificing quality by increasing the effectiveness of the monoglyceride agents. This is accomplished by combining with the monoglyceride agents, under particular physical conditions in the presence of water, a quantity of a fatty acid lactylate.

It has been established that the lactic and polylactic acid esters of the fatty acids, and salts of such acid esters, possess the ability to improve many of the desirable properties of breads and cakes when added thereto in various manners prior to baking. Such addition has been recommended in the form of a mixture with flour (Patent No. 2,744,826), as an incorporation into the shortening for producing high ratio shortening type cake batters (Patent No. 2,973,270), and as a direct addition to dough in the production of breads (Patent No. 2,744,825).

In the case of a mixture with flour, the quantity of the lactylate compound needed to produce optimum results is recommended as being in the vicinity of .5% based on the weight of flour in the product formula. When added to shortenings (including those with increased monoglyceride levels) in the production of high ratio (high sugar to flour content) shortening type cakes of the variety having about 30% shortening based on flour weight, the quantity of the lactylate compound required to produce optimum results is stated as being about 3% by weight of shortening, corresponding to about 1% based on the weight of flour. In the case of a direct addition to bread dough, the quantity of the lactylate compound described as optimally effective is preferably around .5% based on the weight of flour used to make the dough.

In accordance with the present invention, the quantity of lactylate compound required to produce optimum results in the production of bakery products has been significantly reduced. Also, the practice of the present invention has been found to produce improved bakery products in instances where the levels of lactylate compound used are materially less than levels heretofore believed to be the minimum for functionality. In addition, the employment of this invention permits the advantages of lactylate compounds to be obtained in certain products, such as sponge cakes, in which it was heretofore believed non-functional.

The principal objects of the present invention are: to provide an improved quality improving agent particularly adapted for use in the production of bakery products; to provide novel emulsifier compositions, including conventional monoglyceride agents, which are improved in effectiveness; to provide a medium for improving the functionality of lactylate compounds; and to provide a method for decreasing the effective levels of lactylate compound in bakery products.

Other objects and advantages of this invention will become apparent from the following description wherein is set forth by way of example certain embodiments of this invention.

The lactylate compounds required in the practice of this invention generally adhere to the following formula:

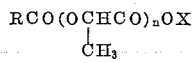

$$RCO(OCHCO)_nOX$$
$$\phantom{RCO(OC}|\phantom{CO)_nOX}$$
$$\phantom{RCO(OC}CH_3$$

wherein RCO is an acyl radical of a fatty acid containing from 16 to 22 carbon atoms and $n$ is the average number from 1 to 6 and preferably from 1 to 3 of lactyl groups and X is hydrogen or another non-toxic cation. Methods for preparing the compounds are clearly disclosed in Patents Nos. 2,733,252 and 2,789,992.

The improved monoglyceride agent or emulsifier is formed by melting the lactylate compound and monoglyceride together and slowly adding water with constant stirring until a smooth O/W emulsion is obtained with the monoglyceride fraction being in the disperse phase and the water being in the continuous phase. The improved emulsifier may be termed a "hydrated lactylated monoglyceride" and upon cooling preferably takes the form of a plastic semi-solid. The optimum quantity of lactylate compound in the improved emulsifier was found to be less than one-half of the quantity of monoglyceride, however, marked improvements in the baked products were obtained at levels of the lactylate compound at approximately 4% of the quantity of monoglyceride in the improved emulsifier.

The quantity of water in the improved emulsifier may vary widely depending primarily upon the particular monoglyceride used, i.e., those derived from the higher fatty acids will form a stable plastic semi-solid emulsion containing more water. In the examples below, the water percentages vary from 54% to 74% based on the total emulsifier composition. Generally, the emulsifier compositions having the higher water percentages are desired for the reason that they provide better component dispersal through the dough or batter. On the basis of the total improved emulsifier composition, the optimum quantity of lactylate compound ranges from 1% to 12% by weight.

The improved emulsifier is included in the bakery products at relatively low levels albeit their high water content. These levels generally range from .3% to 3% based on the flour used in the formula, the higher quantities being used in cakes and sweet goods with high fat content and the lower usage levels being generally confined to breads where the fat percentages are low. With respect to breads, the quantity of the improved emulsifier generally to be recommended is .5% based on the weight of flour in the formula to conform to standards of identity.

The following examples will serve to illustrate the preparation of several bakery products according to this invention and the benefits derived therefrom.

EXAMPLE 1

Emulsifier samples were prepared using as a base a typical monoglyceride of the type commonly referred to as "glyceryl mono stearate" which is often used in manufacturing bread and other yeast-raised bakery goods. The improved emulsifier samples were prepared by melting stearyl-2 lactylic acid with the "glyceryl mono stearate" at a temperature of 70° C. and slowly adding water at 50° C. with constant stirring until a smooth O/W emulsion was obtained. As controls, samples were prepared without stearyl-2 lactylic acid. The emulsions were allowed to cool and become firm plastic solids prior to usage. The emulsifier samples each included 24.5% "glyceryl mono stearate," 1% lecithin and .5% sodium propionate added as a preservative. The improved emulsifier samples were varied in proportionate water content so as to respectively contain 1%, 7% and 20% stearyl-2 lactylic acid by weight. (1% by weight of the emulsifier sample corresponds to about 4% by weight of monoglyceride.)

The emulsifier samples were included in a standard commercial white bread formula at a level of .5% based on the weight of flour and using a conventional sponge-dough procedure.

The bread formula used was as follows:

| | Grams |
|---|---|
| Flour | 700.00 |
| Yeast | 17.5 |
| Sugar | 56.0 |
| Nonfat milk solids | 21.0 |
| Lard | 14.0 |
| Salt | 14.0 |
| Yeast food | 3.5 |
| Water | 434.0 |

Each test was performed in quadruplicate and for additional information a similar white bread formula containing no emulsifier sample was included in the test. After baking, the loaves were stored for forty-eight hours in polyethylene bags. At the end of this time, they were subjected to a standard measurement for crumb compressibility using a Universal penetrometer. Each value given in Table 1 represents an average of twelve measurements.

After completion of the compressibility measurements, the bread was scored subjectively using a system which separately takes account of the major internal and external characteristics of the loaves. These characteristics include loaf volume, crust color, crust character, break and shred, grain texture, crumb color, aroma, taste and eating quality. In the scoring of the bread, each factor is considered separately and penalized according to the degree of deviation from a hypothetical perfect loaf of bread which would have a score of 100. Using this system, an acceptable loaf of bread will receive a score of 80 or higher with a score of 84 or higher considered excellent. The scoring system used in these evaluations is based essentially on that promulgated by the American Institute of Baking and is comparable to the various methods used throughout the baking and milling industries.

The results follow:

Table 1

| Level of stearyl-2 lactylic acid in emulsifier composition | Quantity of emulsifier composition based on flour, percent | Level of stearyl-2 lactylic acid based on flour, percent | Average compressibility (.1 mm.) | Average quality score |
|---|---|---|---|---|
| None | .5 | | 157 | 84.5 |
| 1% | .5 | .005 | 168 | 84.5 |
| 7% | .5 | .035 | 172 | 85.5 |
| 12% | .5 | .060 | 166 | 85.5 |
| 20% | .5 | .100 | 156 | 84.0 |
| | None | | 141 | 84.0 |

The data clearly demonstrates that the inclusion according to this invention of only about .005% stearyl-2 lactylic acid based on flour in a typical bread dough composition resulted in improved crumb compressibility without detracting from product quality. The inclusion of about .035% of the lactylic acid produced optimum results, improving both crumb compressibility and average quality score. Decreasing quality and/or compressibility was noted at higher levels of the lactylate in the dough which approached the levels recommended as the lower functional limit for bread production in the prior art, the recommended optimum in the prior art being around .5% of the lactylate in a bread formula apparently having no monoglyceride enrichment.

EXAMPLE 2

A series of control emulsifier samples were prepared for high ratio white shortening type cakes using monoglyceride 20%, propylene glycol 8% as a preservative, lecithin 2% and the balance, water. Experimental emulsifier samples were prepared with the same composition except that stearyl-2 lactylic acid varying from 6% to 20% was included. White cakes were baked using the following typical formula and procedure:

| | Grams |
|---|---|
| Cake flour | 100 |
| Sugar | 120 |
| High ratio shortening | 35 |
| Salt | 3 |
| Egg albumen | 14 |
| Powdered milk | 10 |
| Baking powder | 6¼ |
| Water | 122 |

All of the dry ingredients and 60 grams of water were placed in a mixer and creamed together with the shortening and 3 grams of an emulsifier sample at low speed for four minutes. The egg albumen was dispersed in the remainder of the water and added in three increments during a period of two minutes and the mixing continued for another two minutes. The batter specific gravity was then measured by weighing a given volume. Thirteen ounces of batter were scaled into an eight-inch round cake pan. The cakes were baked for twenty-five minutes at 360° F. and stored in moisture-proof containers overnight. On the following day, the cakes were sliced and scored using the evaluating system described in the standard manual, Cereal Laboratory Methods, sixth edition. Table 2 summarizes the results:

Table 2

| Level of stearyl-2 lactylic acid in emulsifier composition | Quantity of emulsifier composition based on flour, percent | Level of stearyl-2 lactylic acid based on flour, percent | Batter specific gravity | Cake score |
|---|---|---|---|---|
| None | 3 | None | .86 | 86 |
| 6% | 3 | .18 | .83 | 95 |
| 9% | 3 | .27 | .75 | 96 |
| 12% | 3 | .36 | .70 | 98 |
| 15% | 3 | .45 | .79 | 95 |
| 20% | 3 | .60 | .76 | 93 |

The data shows that a typical white cake of the type containing approximately one-third high ratio shortening based on flour weight achieves optimum improvement with the addition of about .36% stearyl-2 lactylic acid according to this invention. Decreasing improvement was noted at higher levels of the lactylate. The recommended optimum level of the lactylate in the prior art for this type of cake is about .90% by weight of flour.

EXAMPLE 3

Using the emulsifier composition containing 12% stearly-2 lactylic acid disclosed in Example 2, a group of cakes were baked containing from 0 to 9% of the emulsifier composition based on the weight of flour. The cake formula and procedure were similar to that described in Example 2. Prior to scoring the volume of the cakes were measured using the techniques described in the periodical, "Cereal Science," vol. 6, No. 1, page 11. The results follow:

Table 3

| Quantity of emulsifier composition based on flour | Level of stearyl-2 lactylic acid based on flour, percent | Batter specific gravity | Cake volume (cc.) | Cake score |
|---|---|---|---|---|
| 0 | | .86 | 945 | 86 |
| 1% | .12 | .765 | 1,100 | 94 |
| 3% | .36 | .72 | 1,150 | 97 |
| 5% | .60 | .685 | 1,105 | 95 |
| 7% | .84 | .605 | 1,080 | 93 |
| 9% | 1.08 | .63 | 1,105 | 92 |

The grain of the cakes was opened and crumb color was adversely affected above 5% emulsifier based on flour.

The data demonstrates that an optimum increase in cake quality was obtained with about 3% of the improved emulsifier composition based on flour; however, a marked quality increase was noted at levels of only 1% of the improved emulsifier composition. The levels of commercial monoglyceride emulsifiers generally used to produce a significant improvement in a cake of this type is around 2 to 3% based on flour even though the regular emulsifiers contain about 40% monoglyceride.

EXAMPLE 4

A third group of white cakes were baked using the same formula and procedure of Example 2 except that in half the cakes a regular hydrogenated shortening was used instead of a high ratio shortening. The test was conducted with levels of both 2% and 3% (by flour weight) of the improved emulsifier composition containing 20% monoglyceride and 12% stearyl-2 lactylic acid. For further comparison, the test was repeated substituting a commercially available "hydrated monoglyceride" cake emulsifier containing approximately 40% monoglyceride for the improved emulsifier composition and at similar levels. The results follow:

Table 4

| Emulsifier composition | Shortening type | Level of emulsifier based on flour, percent | Specific gravity | Volume | Score |
|---|---|---|---|---|---|
| Improved | High ratio | 2 | .740 | 1,215 | 97 |
| Commercial | do | 2 | .835 | 1,080 | 94 |
| Improved | do | 3 | .715 | 1,260 | 98 |
| Commercial | do | 3 | .820 | 1,150 | 93 |
| Improved | Regular hydrogenated | 2 | .780 | 1,160 | 95 |
| Commercial | do | 2 | .870 | 945 | 87 |
| Improved | do | 3 | .740 | 1,160 | 97 |
| Commercial | do | 3 | .835 | 1,050 | 92 |

Table 4 indicates that the improved emulsifier composition produced significantly better cakes than the same level of a commercial emulsifier composition containing approximately twice the level of monoglyceride. This held true regardless of the type of shortening used.

EXAMPLE 5

It has been heretofore believed that the lactylate compound is non-functional unless incorporated in the shortening in the production of cakes, Patent No. 2,973,270, column 2, line 69, to column 3, line 3. Baking studies were conducted with a sponge cake formula containing no shortening to demonstrate the advantages of this invention. The formula and procedures follow:

| | Grams |
|---|---|
| Cake flour | 100 |
| Sugar | 120 |
| Whole egg | 60 |
| Milk powder | 8 |
| Salt | 2 |
| Water | 46 |
| Emulsifier | Variable |

The ingredients were mixed 5 minutes at medium speed and then the following was added:

| | Grams |
|---|---|
| Water | 24 |
| Baking powder | 3 |

After measuring specific gravity, the batters were scaled at ten ounces into 8-inch round cake pans. The cakes were baked 25 minutes at 360° F. and stored in moisture-proof containers overnight. Volumes were measured on the following day and the cakes were then sliced and scored. The results follow:

Table 5

| Improved emulsifier based on flour | Batter specific gravity | Cake volume (cc.) | Cake score |
|---|---|---|---|
| 0 | 1.035 | 730 | 77 |
| 1% | .705 | 990 | 93 |
| 3% | .465 | 1,205 | 97 |
| 5% | .535 | 1,005 | 94 |
| 7% | .372 | 1,145 | 88 |

Cakes having over 3% emulsifier were grossly over-emulsified and over-tenderized and would not be marketable.

In order to validate the results, the test was repeated in an identical manner but using 2½% of the improved emulsifier for comparison with sponge cakes having 2½% of a commercial cake emulsifier (about 40% monoglyceride). The results follow:

Table 5a

| Emulsifier type | Emulsifier based on flour, percent | Batter specific gravity | Cake volume (cc.) | Cake score |
|---|---|---|---|---|
| Improved | 2½ | .528 | 1,140 | 98 |
| Commercial | 2½ | .562 | 1,180 | 95 |

The data clearly shows that small amounts of the lactylate compound is functional in sponge cakes without shortening when used in accordance with this invention.

It is to be understood that while I have described certain forms of my invention, it is not to be limited to the specific forms herein described except insofar as such limitations are included in the claims.

What I claim and desire to secure by Letters Patent is:

1. A lactylate compound containing emulsifier composition for use in bread dough in levels which add an optimum of about .035% of said lactylate compound to the dough based on weight of flour consisting essentially of; an O/W emulsion including from about 54% to 74% by weight of water and from about 1% to 12% by weight of said lactylate compound and substantially the balance of monoglyceride, said lactylate compound and monoglyceride being a mixture in the disperse phase and said water being in the continuous phase, said fatty acid lactylate compound being of the formula

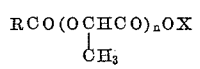

wherein RCO is an acyl radical of a fatty acid containing from 16 to 22 carbon atoms and *n* is a number from 1 to 6 representing the average number of lactyl groups and X is a non-toxic cation.

2. A lactylate compound containing emulsifier composition for use in shortening cake batter containing approximately ⅓ shortening based on flour weight in levels which add an optimum of about .36% of said lactylate compound to the batter based on weight of flour consisting essentially of; an O/W emulsion including from about 54% to 74% by weight of water and from about 1% to 12% by weight of said lactylate compound and substantially the balance of monoglyceride, said lactylate compound and monoglyceride being a mixture in the disperse phase and said water being in the continuous phase, said fatty acid lactylate compound being of the formula $$RCO(OCHCO)_nOX$$
$$\phantom{RCO(O}|$$
$$\phantom{RCO(OCHCO)_n}CH_3$$

wherein RCO is an acyl radical of a fatty acid containing from 16 to 22 carbon atoms and *n* is a number from 1 to 6 representing the average number of lactyl groups and X is a non-toxic cation.

3. A lactylate compound containing emulsifier composition for use in sponge cake batter containing no shortening consisting essentially of; an O/W emulsion including from about 54% to 74% by weight of water and from about 1% to 12% by weight of said lactylate compound and substantially the balance of monoglyceride, said lactylate compound and monoglyceride being a mixture in the disperse phase and said water being in the continuous phase, said fatty acid lactylate compound being of the formula $$RCO(OCHCO)_nOX$$
$$\phantom{RCO(O}|$$
$$\phantom{RCO(OCHCO)_n}CH_3$$

wherein RCO is an acyl radical of a fatty acid containing from 16 to 22 carbon atoms and *n* is a number from 1 to 6 representing the average number of lactyl groups and X is a non-toxic cation.

References Cited by the Examiner

UNITED STATES PATENTS

| | | | |
|---|---|---|---|
| 2,744,825 | 5/56 | Thompson et al. | 99—91 |
| 2,744,826 | 5/56 | Thompson et al. | 99—91 X |
| 2,895,879 | 7/59 | Brokaw | 260—410.7 X |
| 2,932,574 | 4/60 | Bour | 260—410.7 X |
| 2,973,270 | 2/61 | Thompson et al. | 99—123 |
| 3,033,686 | 5/62 | Landfried et al. | 99—91 |

FOREIGN PATENTS 561,704  8/58  Canada.

OTHER REFERENCES

"The Journal of the American Oil Chemists' Society," January 1958, vol. XXXV, No. 1, pages 49 to 52.

A. LOUIS MONACELL, *Primary Examiner.*

TOBIAS E. LEVOW, NOMAN G. TORCHIN, WILLIAM B. KNIGHT, *Examiners.*